(12) United States Patent
Carey et al.

(10) Patent No.: US 6,302,625 B1
(45) Date of Patent: Oct. 16, 2001

(54) METHOD AND APPARATUS FOR REFURBISHING A GAS TURBINE AIRFOIL

(75) Inventors: Patrick R. Carey, Rockfall; Richard M. Murphy, Durham; Dennis C. Shooter, Columbia; Douglas E. Duke, Hebron; Zonda L. Feulner, Tolland, all of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/418,742

(22) Filed: Oct. 15, 1999

(51) Int. Cl.$^7$ ................................. B23C 1/20; B23C 3/18
(52) U.S. Cl. ..................... 409/132; 409/138; 409/180; 29/889.1; 29/402.19; 451/358
(58) Field of Search ............... 29/889.1, 402.19, 29/889.7, 889.23, 889, 402.06; 409/180, 178, 179, 138, 132, 131, 175, 301, 298; 451/358, 438, 45, 241, 182

(56) References Cited

U.S. PATENT DOCUMENTS

| | | | |
|---|---|---|---|
| 2,336,303 | * 12/1943 | Schubert | 29/889.3 |
| 2,585,973 | * 2/1952 | Stieglitz | 29/889 |
| 2,680,392 | * 6/1954 | Gaved | 29/889.7 |
| 2,993,312 | * 7/1961 | Holland et al. | 451/349 |
| 3,007,287 | * 11/1961 | Esopi | 451/241 |
| 3,075,216 | * 1/1963 | Wiener | 409/178 |
| 3,308,720 | 3/1967 | Banner et al. | |
| 3,881,280 | * 5/1975 | Thompson | 451/241 |
| 4,015,509 | 4/1977 | Malinowski et al. | |
| 4,149,449 | 4/1979 | Malinowski et al. | |
| 4,550,497 | * 11/1985 | Sharon | 29/889.1 |
| 4,608,756 | * 9/1986 | Sharon | 29/402.06 |
| 4,639,991 | * 2/1987 | Sharon | 29/402.19 |
| 4,805,282 | * 2/1989 | Reaves et al. | 29/889.1 |
| 5,197,191 | 3/1993 | Dunkman et al. | |
| 5,281,062 | 1/1994 | Dunkman et al. | |
| 5,644,394 | 7/1997 | Owens . | |
| 5,954,464 | 9/1999 | Dansereau et al. | |

* cited by examiner

Primary Examiner—William Briggs
Assistant Examiner—Erica Ergenbright

(57) ABSTRACT

A portable device for refurbishing an edge of an airfoil is provided that has an edge shaper and airfoil positioners that positively engage the airfoil. A method for refurbishing an edge of an airfoil is also provided that includes the steps of (a) providing the portable refurbishing device; (b) locating the edge shaper and the airfoil edge relative to one another with the positioners; and (c) moving one of the device or the airfoil relative to the other along the airfoil edge.

6 Claims, 3 Drawing Sheets

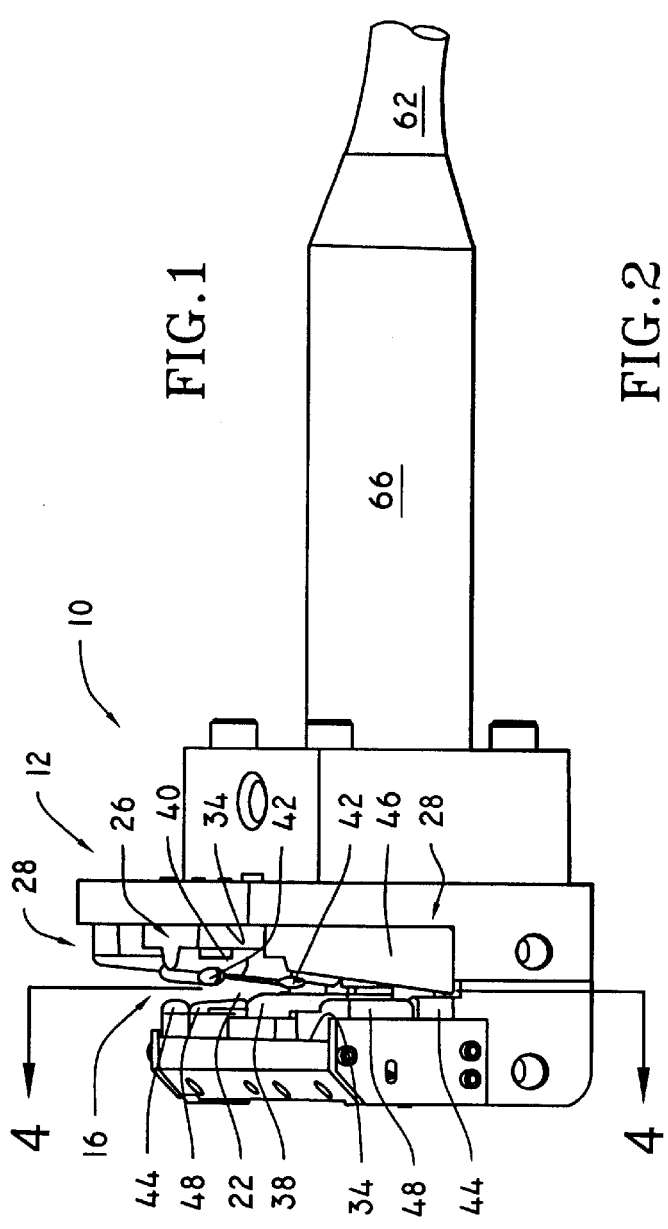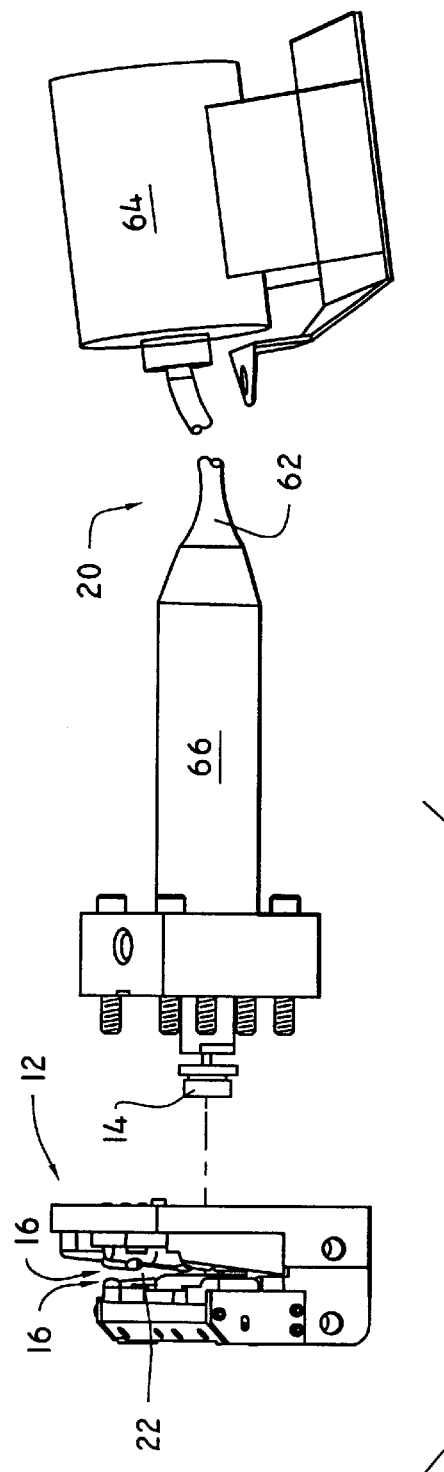

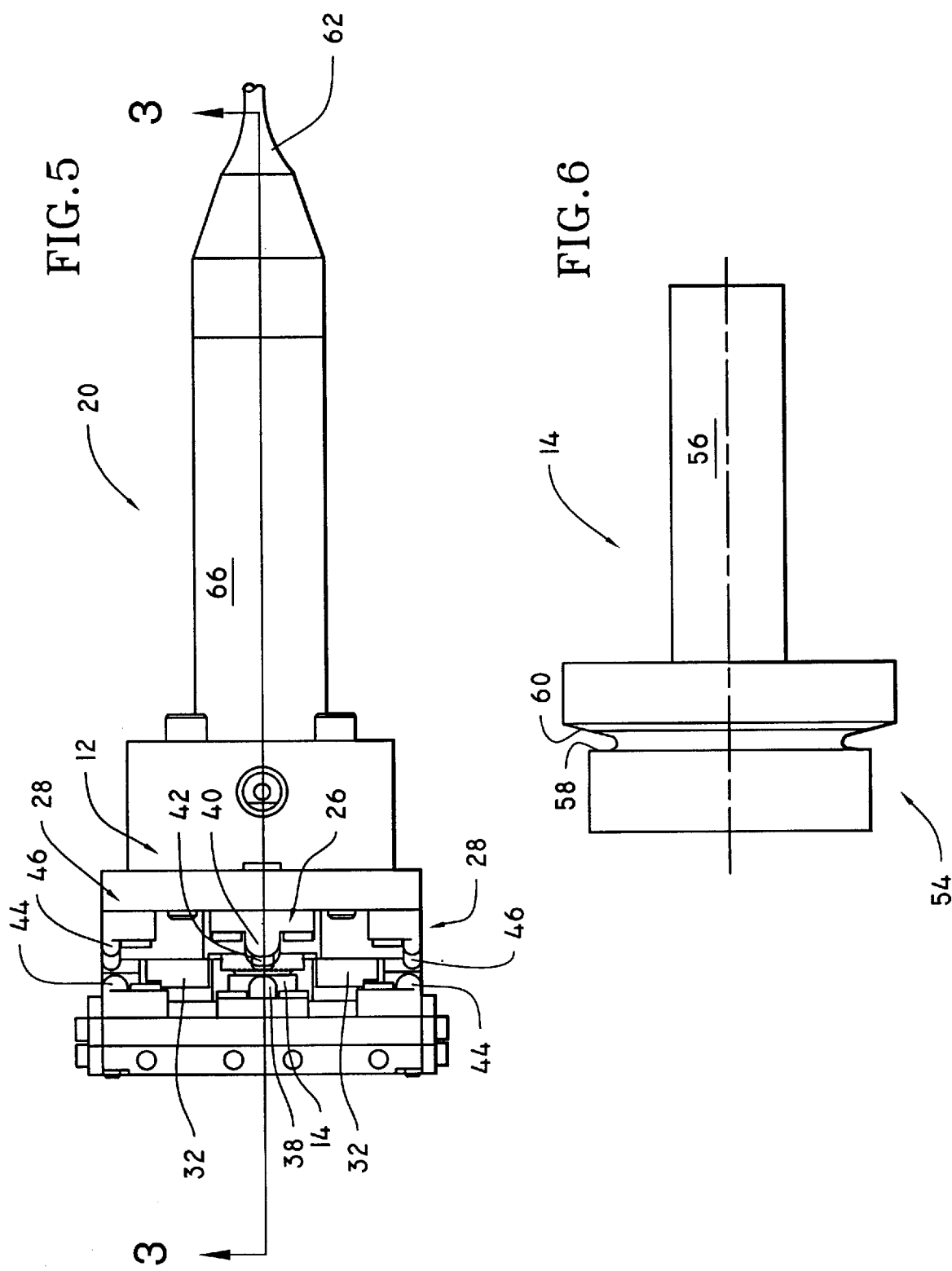

METHOD AND APPARATUS FOR REFURBISHING A GAS TURBINE AIRFOIL

BACKGROUND OF THE INVENTION

1. Technical Field

This invention relates to gas turbine airfoils in general, and to methods and apparatus for refurbishing gas turbine airfoils in particular.

2. Background Information

Gas turbine engines, particularly those in aircraft applications, will occasionally ingest substances (e.g., water and sand) entrained within air drawn into the engine. The substances will wear rotorblades and stator vanes ("airfoils") located within the engine. The leading edge of an airfoil is particularly susceptible to this type of damage. Left unchecked, deformation and erosion will negatively affect the performance of the airfoil and can eventually cause irreparable damage to an airfoil. To minimize performance loss and to ensure safe operation, airfoils are periodically inspected for deformation and wear both on-wing and during regularly scheduled overhaul and maintenance. In those instances where the wear is beyond acceptable standards, the rotor blade or stator vane must be refurbished or replaced. A person of skill in the art will recognize that airfoils within a gas turbine engine, particularly fan blades within modern high-bypass ratio fan blades, are very expensive to replace. Hence, there is considerable advantage in refurbishing gas turbine airfoils when possible.

If, for example, the leading edge of a fan blade is worn beyond acceptable standards, present refurbishment methods generally require that the aircraft be taken off-line, and the fan assembly subsequently removed from the engine and disassembled so the worn airfoil can be refurbished. If the wear is within predetermined limits, the leading edge is refurbished by machining the leading edge back to or near original specifications Although refurbishing a blade using presently known techniques is preferable to replacing the blade, there are nevertheless several undesirable aspects associated with such a process. First, the aircraft is typically taken out of service thereby eliminating its revenue producing potential. Second, there is considerable labor and cost involved in removing the blade from the engine particularly when the engine is mounted on-wing. In addition, when a rotor assembly is disassembled it is sometimes necessary to perform a "run-up" test before the engine can be allowed back in service. Testing of this nature, while prudent and necessary, nevertheless also increases the cost of the repair. Third, fan blade leading edges are typically refurbished using a manual process. The accuracy of the refurbishment is important because the leading edge profile is critical to the aerodynamic performance of the airfoil, and consequent performance of the engine. Accurately refurbishing the edge by hand requires considerable skill and time and is generally considered to be a long lead-time process. This is particularly true for ultra-high bypass fan blades that have significant twist and curve.

In instances where a foreign object more substantial than water or sand (e.g., rocks, birds, etc.) is ingested into the engine and impacts a rotor blade or stator vane, quite often a nick or dent occurs too large to be accommodated by refurbishment. If the damage is within allowable standards, a blending operation can be used to repair the damage. To our knowledge, blending operations do not restore the airfoil leading edge to its original profile. In fact some practices involve removing a curved portion out of the edge to eliminate the damage. The depth of the curved portion into the airfoil causes the repaired edge to be blunter than the original edge. A person of skill in the art will recognize that a blunter edge, even one that is only slightly different, will likely have appreciable impact on the aerodynamic performance of the airfoil. Another problem with some blending operations is that they involve forming tools that are not completely guided or have only limited guidance relative to the edge to be blended. Limited guidance cutting tools are often harder to control making it harder for the operator to produce the desired leading edge profile. In addition, if used improperly, a blending tool can gouge and irreparably damage an airfoil during the repair process. For these reasons, blending tools are not well suited for edge refurbishment.

What is needed, therefore, is a method and/or an apparatus for refurbishing gas turbine airfoils that can be used on airfoils mounted within a gas turbine engine, and one that does not require considerable skill to perform or use.

DISCLOSURE OF THE INVENTION

It is, therefore, an object of the present invention to provide an apparatus and a method for refurbishing gas turbine airfoils that requires less skill than is necessary to perform some conventional refurbishment methods.

It is another object of the present invention to provide an apparatus and a method for furbishing gas turbine fan blades that can be used on engine mounted fan blades.

According to the present invention, a method for refurbishing an edge of an airfoil is provided that includes the steps of: (a) providing a portable refurbishing device having an edge shaper and airfoil positioners that positively engage the airfoil; (b) locating the edge shaper and the airfoil edge relative to one another with the positioners; and (c) moving one of the device or the airfoil relative to the other along the airfoil edge.

The present invention provides several significant advantages over the prior art of which we are aware. One of those advantages lies in the ability of the present invention to refurbish the edge of a fan blade while that fan blade is mounted within the engine. As a result, the amount of time an aircraft is out of service for fan blade refurbishment is significantly decreased. Performing the refurbishment on a mounted fan blade also eliminates the substantial cost of removing and reinstalling the engine, and the cost of testing the reassembled engine.

Another significant advantage of the present invention is that the refurbishment does not require a highly skilled operator. The positioners within the device ensure the airfoil edge is properly located relative to the edge shaper, thereby decreasing the opportunity for error, consequently facilitating the refurbishment process. The positive engagement of the positioners also helps to prevent inadvertent gouging that may occur with some prior art devices.

Another advantage of the present invention is that a method and device is provided that is designed to refurbish substantially all of the airfoil edge. Pushing the present device along the airfoil edge helps to create a continuous uniform machined surface. Hand-held blending devices are typically designed to machine small, localized areas and are not well-suited to provide a continuous machined surface. The continuous uniform surface possible with the present method and device can be shaped in agreement with the original specification geometry to ensure improved aerodynamic performance.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 1 is a perspective view of the refurbishing device.

FIG. 2 is an exploded view of the refurbishing device.

FIG. 5 is a top view of the refurbishing device.

FIG. 6 is a diagrammatic enlarged view of the edge shaper.

DETAILED DESCRIPTION OF THE INVENTION

Figure 3:
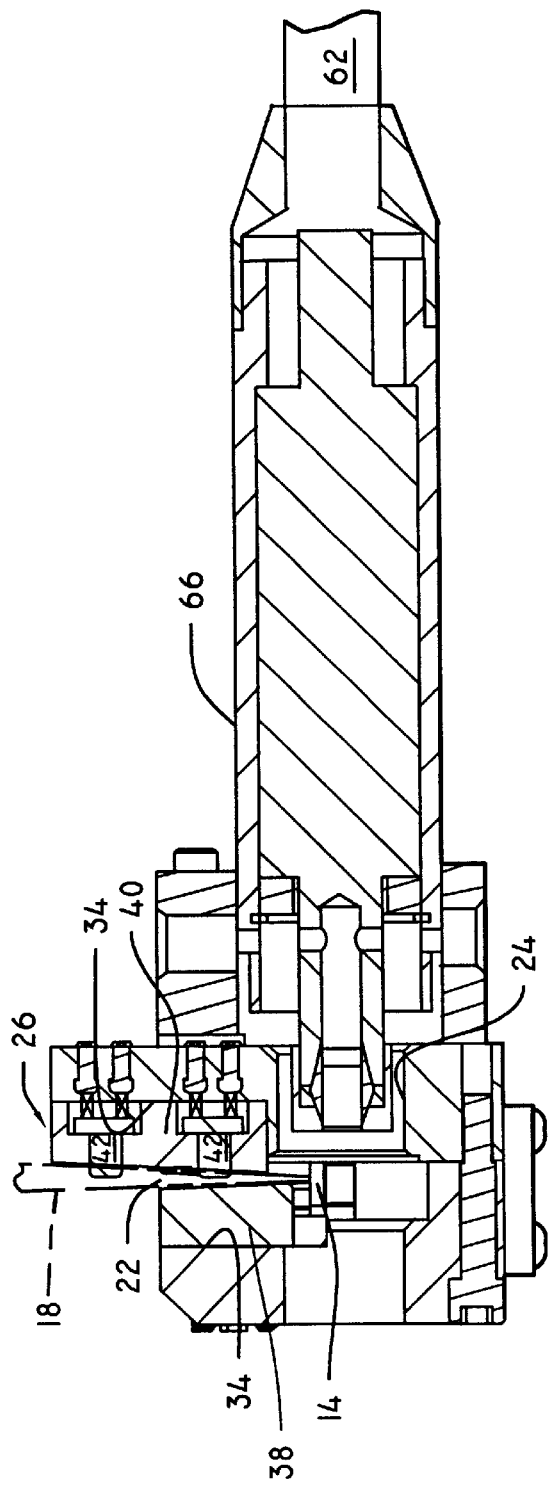
FIG. 3 is a sectional view of the refurbishing device shown in FIGS. 1 and 5, sectioned along plane 3—3 as shown in FIG. 5.

Referring to FIGS. 1 and 2, an airfoil edge refurbishment device 10 includes a housing 12, an edge shaper 14 (see FIG. 2), positioners 16 for positively positioning an airfoil 18 (see FIGS. 3 and 4) relative to the edge shaper 14, and a drive 20. The housing 12 includes a channel 22 within which the airfoil edge is received and an aperture 24 (see FIG. 3) for receiving the edge shaper 14. The aperture 24 intersects the channel 22 and allows the edge shaper 14 to be mounted at a fixed position within the channel 22. The housing 12 is sized so that it may be hand held by an operator.

Referring to FIGS. 1 and 3–5, the positioners 16 include three airfoil locator sets 26,28 attached to the interior side surfaces 34 of the channel 22, and a set of base pads 32 in the base 36 of the channel 22. The locator sets include a center locator set 26 and a pair of end locator sets 28. The center locator set 26 includes a pair of slides 38,40 positioned opposite one another, and one or more biasing pads 42 extending out from one or both slides 38,40 in a direction toward the opposite slide 40,38. The end locator sets 28 each include a pair of slides 44,46 positioned opposite one another, and one or more biasing pads 48 extending out from one or both slides 44,46 in a direction toward the opposite slide 46,44. The slides 38,40,44,46 of each locator set are angularly disposed relative to one another in the same set. The biasing pads 42,48 are spring-loaded or otherwise biased to cause the airfoil 18 to be positively engaged while received within the channel 22. In the preferred embodiment, the slides 38,40,44,46 and biasing pads 42,48 of the center and end locator sets 26,28 are arcuately shaped to accommodate three-dimensional curved and twisted airfoils 18.

Figure 4:
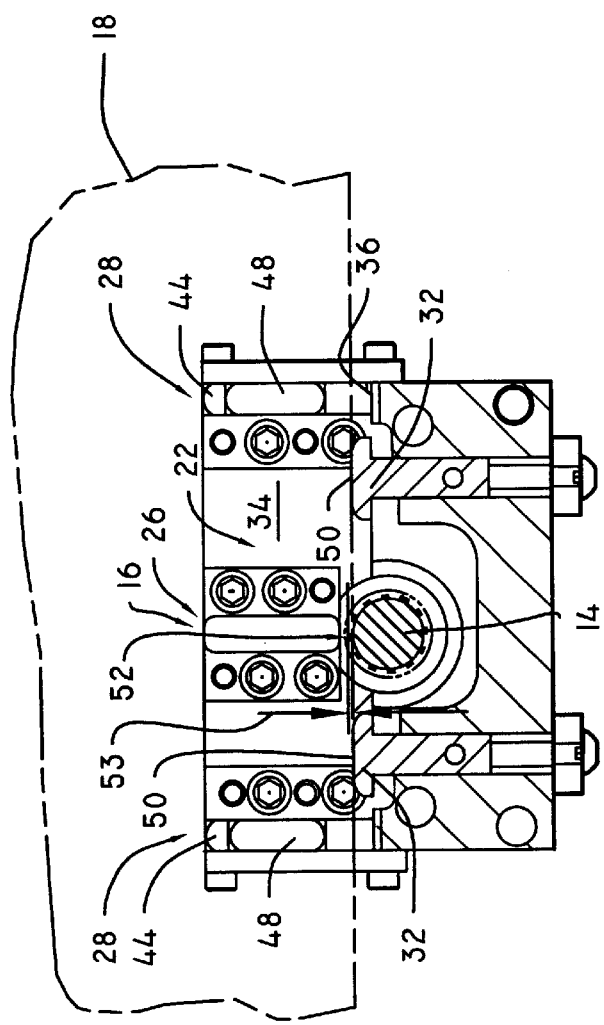
FIG. 4 is a sectional view of the refurbishing device shown in FIG. 1 sectioned along plane 4—4.

Referring to FIG. 4, the base pads 32 extend lengthwise along the base 36 of the channel 22. When an airfoil 18 is engaged within the channel 22, the base pads 32 extend lengthwise along the edge of the airfoil 18, substantially aligned with the airfoil edge. The base pads 32 are biased (e.g., by a spring) toward the top of the channel 22, preferably extending above the edge shaper 14 to prevent inadvertent engagement of the edge shaper 14 with the airfoil edge. The base pads 32 can be depressed toward the base 36 of the channel 22 to a position where the airfoil contact surface 50 of each base pad 32 is aligned with or below the cutting surface 52 of the fixed position edge shaper 14, thereby exposing the edge shaper 14 to the airfoil edge. The distance 53 between the airfoil contact surfaces 50 of the base pads 32 and the cutting surface 52 of the edge shaper 14 represents the airfoil edge depth of cut per pass.

Referring to FIG. 6, the edge shaper 14 includes a rotary wheel 54 mounted on a shaft 56. The circumferential surface profile of the rotary wheel 54 permits the airfoil edge to be refurbished substantially within original manufacturing geometric tolerances for the airfoil edge. The profile is asymmetric and includes a pressure-side machining surface 58 and a suction-side machining surface 60 that arcuately meet one another. The length of the pressure-side machining surface 58 is shorter than that of the suction-side machining surface 60. Preferably, the pressure-side machining surface 58 is approximately one-half the length of the suction-side machining surface 60. In the preferred embodiment, a portion of the profile of the rotary wheel 54 has a contour that follows the original cross-sectional geometry of the fan blade at the leading edge and in some cases the profile also follows a portion of the blade aft of the leading edge as well. The method by which the shaping wheel 54 removes material from the airfoil edge can be selectively chosen to suit the airfoil material at hand; e.g., a milling or an abrasive type operation.

Referring to FIG. 2, the drive 20 for the edge shaper 14 can be electrical, hydraulic, or pneumatic. An example of an acceptable drive is a commercially available variable speed electrical drive having a flexible output shaft 62. One end of the flexible shaft 62 is connected to an electric motor 64 and the other end is connectable to a chuck 66 for holding the shaft 56 of the edge shaper 14. The chuck 66 is attachable to the housing 12 of the refurbishing device 10. The electric motor 64 may be mountable in a harness or other operator supported device (not shown). Alternative drives may be mounted directly to the refurbishing device housing 12, thereby avoiding the need for flex shaft and motor separate from the chuck.

During periodic maintenance airfoils within a gas turbine engine are inspected for wear and damage. Airfoil edge wear that is beyond acceptable operating standards but still within repairable limits can be refurbished back to within acceptable standards. Nicks, dents, and other types of localized damage are distinguishable from wear and are typically caused by foreign object impacts. Airfoil edge wear is more widespread, generally extending over more than 50% of the fan blade leading edge. The present refurbishment method is described below as an "onwing" refurbishment of a fan blade. The present method and device are not limited, however, to fan blade on-wing refurbishments. As will be shown below, the present method and device provide a means by which the leading edge of a fan blade or other airfoil can be refurbished to within or very near original specifications without complicated set-up or highly skilled labor. As a result, there is considerable utility in using the present method and device to refurbish disassembled airfoils as well.

For an on-wing refurbishment, the fan blade to be refurbished is first locked into position using wedges or other means to prevent the fan stage containing the fan blade assembly from rotating. The fan blade is cleaned with a solvent to remove contaminants that may impede, interfere, or negatively affect the refurbishment process. Because fan blade leading edge wear is typically more pronounced in the middle half to three-quarters of the airfoil span, the refurbishment device 10 is placed on the fan blade near the base or tip. The fan blade is inserted into the channel 22 of the device until the edge of the airfoil contacts the contact surfaces 50 of the spring loaded base pads 32 extending out from the base 36 of the channel 22. In this position, the base pads 32 help prevent inadvertent contact between the airfoil edge and the edge shaper 14. The center locating slides 38,40 and associated biasing pads 42 locate the airfoil edge relative to edge shaper 14. The end locating slides 44,46 and associated biasing pads 48 cooperate with one another to guide the airfoil 18 into and out of the center locating slides 38,40, and therefore the edge shaper 14. The operator engages the refurbishing device 10 by pushing it toward and along the edge of the fan blade. Push the refurbishing device 10 toward the edge causes the base pads 32 to depress a distance 53 below the cutting surface 52 of the edge shaper 14, thereby exposing the edge of the airfoil to the edge shaper 14. The refurbishment device 10 is subsequently pushed along substantially the entire span of the fan blade, refurbishing the leading edge as it goes. In some embodiments, a first guide fixture is attached to the fan blade adjacent the tip of the fan blade. In other instances, a second guide fixture is attached adjacent the base of the fan blade. Surfaces attached to the guide fixtures help transition the refurbishment device 10 into or out of engagement with the airfoil edge. The depth of cut per pass is controlled by the distance between the airfoil edge contact surfaces 50 of the base pads 32 when fully depressed and the cutting surface 52 of the edge shaper 14. The depth of cut per pass is, therefore, predetermined and fixed as a function of the positioners 16. This process is repeated as many times as is necessary to contour the airfoil edge back within acceptable standards. After the airfoil edge refurbishment is complete, the edge is polished and cleaned using standard practices.

Although this invention has been shown and described with respect to the detailed embodiments thereof, it will be understood by those skilled in the art that various changes in form and detail thereof may be made without departing from the spirit and the scope of the invention. For example, the present method has been described in terms of an on-wing refurbishment process. The method can be used for airfoils not assembled within an engine as well.

What is claimed is:

1. A method for refurbishing a spanwise extending edge of a fan blade mounted within a gas turbine engine, comprising the steps of:
   (a) providing a portable refurbishing device having a channel, a plurality of locator sets disposed in said channel, and a rotary edge shaper;
   (b) securing said fan blade to prevent said fan blade from moving within said engine;
   (c) placing a portion of said edge into said refurbishing device channel, wherein said edge portion is located adjacent a tip or a base of said fan blade;
   (d) locating said edge within said channel using said locator sets;
   (e) engaging said edge with said edge shaper, and
   (f) moving said device along said edge, wherein said edge shaper refurbishes said edge while moving along said edge.

2. A portable device for refurbishing an airfoil, comprising:
   a housing having a channel with sides and a base;
   a rotary edge shaper, having a wheel with a contoured cross-sectional profile for removing material from said airfoil, wherein a portion of said wheel extends into said channel;
   a center locator set disposed within said channel, said center locator set having a pair of opposing slides, wherein said airfoil is received between said slides and said slides locate said airfoil edge relative to said edge shaper;
   a of base pads mounted in said channel base and said edge shaper is disposed between said base pads, wherein said base pads are biased in a direction away from said channel base, extending to a position where said base pads prevent an airfoil from engaging said edge shaper unless said base pads are depressed toward said channel base; and
   a drive for driving said edge shaper.

3. A portable device for refurbishing an edge of an airfoil, comprising:
   a housing having a channel with sides and a base;
   a rotary edge shaper, having a wheel with a contoured cross-sectional profile for removing material from said airfoil, wherein a portion of said wheel extends into said channel;
   a center locator set having a pair of opposing slides, wherein said airfoil is received between said slides and said slides locate said airfoil edge relative to said edge shaper;
   one or more base pads mounted in said base, biased away from said base, wherein said one or more base pads are positioned to prevent contact between the edge shaper and an edge of an airfoil and can be depressed toward the base to expose the edge shaper to the edge of the airfoil; and
   a drive for driving said edge shaper.

4. The device of claim 3, wherein the edge shaper is disposed between adjacent base pads.

5. A portable device for refurbishing an edge of an airfoil, comprising:
   a housing having a channel with sides and a base;
   a rotary edge shaper, having a wheel with a contoured cross-sectional profile for removing material from said airfoil, wherein a portion of said wheel extends into said channel;
   a center locator set having a pair of opposing slides, wherein said airfoil is received between said slides and said slides locate said airfoil edge relative to said edge shaper;
   a first end locator set and a second end locator set disposed in the channel, wherein the center locator set is disposed between the end locator sets;
   wherein the end locator sets guide the airfoil into and out of the center locator set; and
   a drive for driving said edge shaper.

6. A method for refurbishing a spanwise extending edge of a fan blade for use in a turbine engine, comprising the steps of:
   (a) providing a portable refurbishing device having a channel, a plurality of locator sets disposed in the channel, one or more base pads biased away from a base of the channel, and a rotary edge shaper;
   (b) placing the edge into the refurbishing device channel;
   (c) locating the edge within the channel using the locator sets;
   (d) engaging the edge with said edge shaper by depressing the base pad and thereby exposing the edge to the edge shaper; and
   (e) shaping the edge by moving the refurbishing device along the edge, wherein the edge shaper removes material from the edge to shape the edge.

* * * * *